United States Patent Office 3,575,955
Patented Apr. 20, 1971

3,575,955
REACTIVE AZO DYESTUFFS CONTAINING TRIAZINE, DIAZINE OR ALIPHATIC CARBOXAMIDO GROUPS
Herbert Francis Andrew and Neville Jackson, Manchester, England, assignors to Imperial Chemical Industries Limited, London, England
No Drawing. Filed Mar. 14, 1966, Ser. No. 533,850
Claims priority, application Great Britain, Mar. 29, 1965, 13,259/65; Jan. 7, 1966, 825/66
Int. Cl. C09b 62/08, 62/24, 62/40
U.S. Cl. 260—153  7 Claims

ABSTRACT OF THE DISCLOSURE

Azo dyestuffs of the general formula

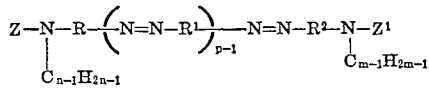

wherein R is a radical selected from the group consisting of phenylene, monosulphophenylene and disulphonaphthalene, $R^1$ is a radical selected from the group consisting of dimethyl - 1,4-phenylene, monomethyl monomethoxy-1,4-phenylene and monosulpho-1,4-naphthylene, $R^2$ is a radical selected from the group consisting of monosulpho-1,4-naphthylene and 1,4-phenylene which may be substituted by up to two radicals selected from the group consisting of a lower alkyl, lower alkoxy, carboxylic acid, lower alkanoylamido and ureido, $m$, $n$ and $p$ each independently have a value of 1 or 2, Z and $Z^1$ are the same or different cellulose-reactive substituents selected from the group consisting of mono- and di-chloro-s-triazine, mono- and dibromo - s - triazine, trichloropyrimidine, 5-cyano-dichloropyrimidine, 5 - cyano - dibromopyrimidine, β - chloro - propionyl, chloroacetyl, 2,4-dichloroquinaozline-6- and 7-carbonyl, 2,3 - dichloroquinoxaline-5- and 6-carbonyl, 2,4 - dichloropyrimidine - 5-carbonyl and acrylyl. These dyestuffs are valuable for coloring cellulose textile materials and can be applied thereto by a dyeing or printing process. The azo dyestuff reacts with the cellulose to give colorings having very good fastness to light and to wet treatments.

This invention relates to new reactive dyestuffs, to processes for their manufacture and to processes for colouring cellulose textile materials with the new reactive azo dyestuffs.

A disadvantage of most commercial reactive dyes presently marketed is that the proportion of dyestuff entering into chemical reaction when fixed in the manner recommended by the manufacturers rarely exceeds 70%. Thus, to give effect to the full fastness to wet treatments obtainable from reactive dyes it is necessary to give prolonged washing treatments to the printed material to remove unreacted dyestuffs.

According to the present invention there is provided a class of new azo dyestuffs capable of entering into reaction with cellulose fibre to an unusually high degree. These dyestuffs can be expressed by the general formula:

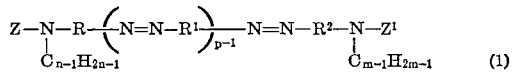 (1)

wherein R and $R^2$ are benzene or naphthalene radicals which are free from hydroxyl groups but which may carry other substituents, $R^1$ is a 1,4-phenylene or 1,4-naphthylene radical which may carry substituents, $m$ and $n$ represent integers of at most 6, $p$ represents 1 or 2, Z and $Z^1$ represent the same or different reactive acyl groups, the radicals R, $R^1$, $R^2$, Z and $Z^1$ being so chosen that the azo dyestuff contains at least two acid water-solubilising groups.

As examples of acid water solubilising groups, there may be mentioned the sulphate ester group and, more particularly, carboxylic acid and sulphonic acid groups. These groups can be distributed in any desired order in the dyestuff molecule.

As examples of radicals represented by $R^1$ there may be mentioned 1,4-phenylene, 2-methyl-1,4-phenylene, 2-methyl-5-methoxy-1,4-phenylene, 6-sulpho, 7-sulpho- and 8-sulpho-1,4-naphthylene, 2-carboxy - 1,4-phenylene, 2-methoxy - 1,4 - phenylene, 2,5 - dimethoxy-1,4-phenylene, 1,4 - naphthylene, 2-acetylamino - 1,4 - phenylene and 2-ureido-1,4-phenylene.

As examples of benzene and naphthylene radicals represented by R and $R^2$, there may be mentioned those stated above for $R^1$ and also 1,5-disulpho-3,7-naphthylene, 2-sulpho-1,4-phenylene, 4-sulpho - 1,3 - phenylene, 2-carboxy-1,4-phenylene, 2-sulpho-1,5-naphthylene and 2-sulpho and 5-sulpho-1,4-naphthylene, and 4,8-disulpho-2,6-naphthylene.

In the above formula $m$ and $n$ preferably represent either 2 or 1.

The term "reactive acyl group" used in connection with Z and $Z^1$ is meant to denote the radical of an organic acid which radical contains one or more atoms or groups capable of addition or substitution reactions with the hydroxyl groups of the cellulose molecule to form a covalent bond.

As examples of acyl radicals which are represented by Z and $Z^1$ there may be mentioned, for example, the radicals of α:β-unsaturated aliphatic carboxylic acids such as acrylic acid, α-chloroacrylic acid, propiolic acid, maleic acid and mono- and di-chloromaleic acids; more particularly Z may represent the radical of an acid which contains a labile halogen atom or a group which readily splits off to form an anion, for example, the radical of a halogenated aliphatic acid such as chloroacetic acid, β-chloro and β-bromo-propionic acids and α,β-dichloropropionic acid or more especially, a heterocyclic radical which contains from 2 to 3 nitrogen atoms in the heterocyclic ring and at least one labile substituent on a carbon atom of the ring. By a labile substituent there is meant an atom or group which is bound to a carbon atom in ortho position to a nitrogen atom of the heterocyclic ring which atom or group is readily replaced by a hydroxyl group under aqueous alkaline conditions.

As examples of such heterocyclic radicals, there may be mentioned, for example, 2,3-dichloro-quinoxaline-5- or -6-sulphonyl, 2,3-dichloro-quinoxaline-5- or -6-carbonyl, 2,4-dichloro-quinazoline-6- or -7-sulphonyl, 2,4,6-trichloroquinazoline-7- or -8-sulphonyl, 2,4,7- or 2,4,8-trichloro-quinazoline-6-sulphonyl, 2,4 - dichloro - quinazoline-6-carbonyl, 1,4-dichloro-phthalazine-6-carbonyl, and, more particularly s-triazin-2-yl and pyrimidin-2-yl or -4-yl radicals which contain on at least one of the remaining 2, 4 or 6 positions, a bromine or, preferably, a chlorine atom, a sulphonic acid group, a thiocyano group, an aryloxy or arylthio group containing an electronegative substituent such as sulphophenoxy, sulphophenylthio, nitrosulphophenoxy, disulphophenoxy and sulphonaphthoxy or a group of the formula:

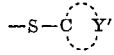

(2)

wherein Y' represents the group of atoms necessary to form a 5- or 6-membered heterocyclic ring which may carry substituents or form part of a fused ring system; or a quaternary ammonium or pyridinium group; or a group of the formula:

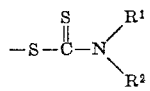

(3)

wherein $R^1$ and $R^2$ each represents the same or different alkyl, cycloalkyl, aryl or aralkyl groups, or $R^1$ and $R^2$ together form, together with the nitrogen atom, a 5- or 6-membered heterocyclic ring; or a group of the formula:

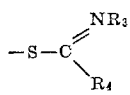

(4)

wherein $R_3$ and $R_4$ may be the same or different and each represents a hydrogen atom or an alkyl, aryl or aralkyl group.

In the cases where the pyrimidine ring or triazine ring carries only one such labile substituent, the said ring may have a non-labile substituent on the remaining carbon atoms.

By a non-labile substituent there is meant a group which is bound by a covalent bond to a carbon atom of the triazine or pyrimidine nucleus, which covalent bond is not ruptured under the conditions used for application of the reactive dye. As examples of such substituents, there may be mentioned, for example, primary amino and hydroxyl groups, also mono- or di-substituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain such substituents as chlorine atoms or hydroxyl, alkoxy or sulphate groups; and phenylamino and naphthylamino groups preferably containing sulphonic acid substituents; in the case of etherified hydroxyl and mercapto groups, this class includes, for example, alkoxy and alkylthio groups preferably those of low molecular weight, i.e. having up to about 4 carbon atoms and phenoxy phenylthio, naphthoxy or naphthylthio groups; as particular examples of all these classses there may be mentioned, for example, methylamino, ethylamino, dimethylamino, β-hydroxy-ethylamino, di-(β-hydroxyethyl)amino, β - chloroethylamino, cyclohexylamino, anilino, sulphophenylamino, disulphophenylamino, N-methylsulphophenylamino, N-β - hydroxyethylsulfophenylamino, carboxyphenylamino and sulphocarboxyphenylamino, methoxy, ethoxy and butoxy, phenoxy, methylphenoxy, chlorophenoxy and phenylthio groups. Chlorine atoms or cyano, nitro, carboxy or carbalkoxy groups in the 5- position of a pyrimidinyl radical come into the category of non-labile substituents.

According to a further feature of the invention there is provided a process for manufacture of the azo dyestuffs of Formula 1 which comprises reacting a diamino azo compound of the formula:

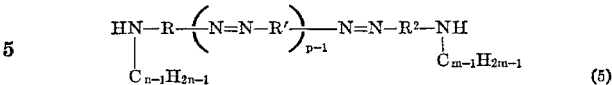

(5)

wherein R, R', $R^2$, m, n and p have the meanings stated above, with two moles of the acid halide or anhydride or an acid which contains a group capable of reaction with the hydroxyl groups of cellulose to form a covalent bond.

The treatment of the diaminoazo compound with the acid halide or anhydride can conveniently be carried out by stirring an aqueous solution of the compound with an aqueous suspension or solution of the acid halide or anhydride; the temperature of the reaction can be varied from 0° to 100° C. and will depend on the ease with which water will react with the acid halide or anhydride group or the group capable of reacting with the fibre.

As examples of anhydrides or acid halides which may be used, there may be mentioned, for example, the anhydrides or acid halides or α:β-unsaturated aliphatic acids such as chloromaleic anhydride, propiolyl chloride and acrylyl chloride, the acid chlorides of halogenaetd aliphatic acids such as chloroacetyl chloride, sulpho-chloro-acetyl chloride, β-bromo and β-chloro-propionyl chloride and α:β-dichloropropionyl chloride, and preferably, heterocyclic compounds which contain at least 2 nitrogen atoms in the heterocyclic rings and which contain 2 or more halogen, especially chlorine, atoms in the ortho positions to the nitrogen atoms, such as 2,3-dichloro-quinoxaline-5- and 6-carboxylic acid chlorides, 2,3-dichloro-quinoxaline-5- and 6-sulphonyl chlorides, 2,4-dichloro-quinazoline-6- and 7- sulphonyl chlorides, 2,4,6-trichloro-quinazoline-7 and 8-sulphonyl chlorides, 2,4,7- and 2,4,8-trichloro-quinazoline-6-sulphonyl chlorides, 2,4-dichloro-quinazoline-6-carboxylic acid chloride, 1,4-dichloro-phthalazine-6-carboxylic acid chloride, 2,4,6-tribromo and trichloro-pyrimidines, 2,4,5,6-tetrachloropyr-imidine, 5-methyl-2,4,6-trichloropyrimidine, 5-nitro-2,4,6-trichloropyrimidine, 2,4-dichloro-5-nitro-6-methylpyrimi-dine, 2,4 - dichloro-5-nitropyrimidine, 2,4,6-trichloro-5-cyanopyrimidine, 5 - carboethoxy-2,4-dichloropyrimidine, 5 - carboxy - 2,4 - dichloropyrimidine, cyanuric bromide and, preferably cyanuric chloride and the primary condensation products of cyanuric bromide or cyanuric chloride with ammonia, an alkali metal sulphite or thiocyanate or an organic mercaptan, hydroxy compound or an organic primary or secondary amine, for example methanol, ethanol, iso-propanol, phenol, o, m- and p-cresols, o-, m- and p-sulphophenols, thiophenol, thiogly-collic acid, dimethyldithio carbamic acid, mercapto-benzthiazole, thioacetamide, methyl-, dimethyl-, ethyl-, diethyl-, n-propyl-, iso-propyl-, butyl-, hexyl- or cyclo-hexylamine, toluidine, piperidine, morpholine, methoxy-ethylamine, ethanolamine, aminoacetic acid, aniline-2:5, 2:4 and 3:5-disulphonic acids, orthanilic, metanilic and sulphanilic acids, 2, 3 and 4-aminobenzoic acids, 4- and 5 - sulpho - 2 - aminobenzoic acids, 5-amino-2-hydroxy-benzoic acid, 2-aminoethanesulphonic acid, aminonaphthalene mono- and di-sulphonic acids and N-methyl-aminoethane sulphonic acid; also, the secondary condensation products of cyanuric chloride with alkali metal sulphites, alkali metal thiocyanates, phenols and the thiophenols containing an electronegative substituent, and compounds of the formulae

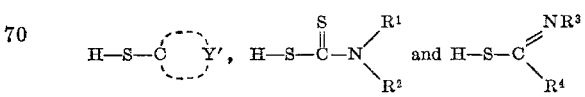

wherein Y', $R^1$, $R^2$, $R^3$ and $R^4$ have the meanings stated above.

The diaminoazo compounds of Formula 5 can be obtained by diazotising an amine of the formula:

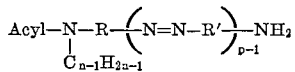 (6)

or

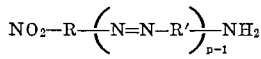 (7)

coupling with an amine of the formula:

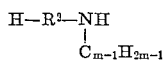 (8)

and hydrolysing off the acyl group or reducing the nitro group to amino, as the case may require.

As examples of amines of Formula 6 there may be mentioned:

6-acetylamino-2-aminonaphthalene,
5-acetylamino-1-aminonaphthalene,
2-acetylamino-1-chloro-6-aminonaphthalene,
7-acetylamino-1-aminonaphthalene,
4-amino-N-methylacetanilide,
6-acetylamino-2-aminonaphthalene-4:8-disulphonic acid,
6-N-methyl-N-acetylamino-2-aminonaphthalene-4:8-disulphonic acid,
6-N-methyl-N-4'-methylbenzenesulphonlylamino-2-amino-naphthalene-4:8-disulphonic acid,
4-N-acetylamino-2-sulphoaniline,
5-N-acetylamino-2-sulphoaniline
4-N-acetylamino-3-sulphoaniline,
5-acetylamino-2-aminobenzoic acid,
4-acetylamino-1-aminonaphthalene-6-sulphonic acid,
4-acetylamino-1-aminonaphthalene-7-sulphonic acid,
5-acetylamino-1-aminonaphthalene-2-sulphonic acid, and the monoazo compounds obtainable by diazotising any of the acylamines just named and coupling with amines of Formula 8 in which $m$ stands for 1.

As examples of amines of Formula 7 there may be mentioned:

6-nitro-3-aminobenzoic acid,
4-nitroaniline-2-sulphonic acid,
5-nitro-2-aminoterephthalic acid,
5-nitroanthranilic acid,
6-nitro-2-aminonaphthalene-4:8-disulphonic acid,
5-nitro-1-aminonaphthalene-4-sulphonic acid,
4-nitro-1-aminonaphthalene-5-sulphonic acid,
4-nitro-1-aminonaphthalene-6-sulphonic acid, and the amines obtained by diazotising any of the amines just named and coupling with an amine Formula 8 in which $m$ stands for 1.

As examples of amines of Formula 8 there may be mentioned:

m-toluidine,
2-methoxy-5-methylaniline,
aniline,
o-toluidine,
anthranilic acid,
1:6- and 1:7-Cleves acids,
o-anisidine,
m-anisidine,
2:5-dimethoxyaniline,
α-naphthylamine,
1-aminonaphthalene-8-sulphonic acid,
m-aminoacetanilide
m-ureidoaniline,
N-methylaniline,
2-methyl-N-methylaniline,
2-methyl-N-ethylaniline, and
2-methyl-5-methoxy-N-methylaniline.

The new dyestuffs of Formula 1 can also be obtained by reacting a compound of the formula:

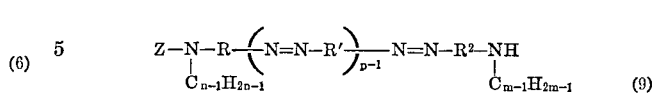 (9)

wherein R, R', R², Z, $m$, $n$, and $p$ have the meanings stated above, with one mole of the acid halide or anhydride of an acid which contains a group capable of reaction with the hydroxyl groups of cellulose to form a covalent bond.

The compounds of Formula 9 can be obtained by diazotising an amine of the formula:

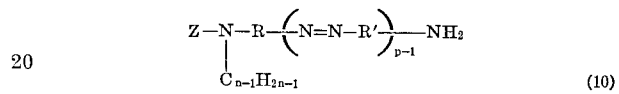 (10)

and coupling with an amine of Formula 8 above.

As examples of compounds of Formula 10 there may be mentioned:

7-acryloyamino-2-aminonaphthalene,
6-acryloylamino-2-aminonaphthalene-4:8-disulphonic acid,
6-chloroacetylamino-2-aminonaphthalene-4:8-disulphonic acid,
6-chloropropionylamino-2-aminonaphthalene-4:8-dissulphonic acid,
6-N-[2'-chloro-4'(3''-sulphophenylamino)-s-triazin-2'-yl]amino-2-aminonaphthalene-4:8-disulphonic acid,
6-N-(2':3'-dichloro-quinoxaline-5'(or -6')sulphonyl-amino)-2-aminonaphthalene-4:8-disulphonic acid,
6-N-(2':3'-dichloroquinoxaline-5'(or -6')carbonyl-amino)-2-aminonaphthalene-4:8-disulphonic acid,
6-N-(2':4'-dichloroquinazoline-6'(or -7')sulphonyl-amino)-2-aminonaphthalene-4:8-disulphonic acid,
6-N-(2':4'-dichloroquinazoline-6' (or -7')sulphonyl-amino)-2-aminonaphthalene-4:8-disulphonic acid,
6-N-(1':4'-dichlorophthalazine-6'-carbonyl-amino)-2-aminonaphthalene-4:8-disulphonic acid,
6-N-(dichloropyrimidinylamino)-2-aminonaphthalene-4:8-disulphonic acid,
6-N-(2':5':6'-trichloropyrimidinylamino)-2-aminonaphthalene-4:8-disulphonic acid,
6-N-(2':4':5'-trichloropyrimidin-6'-ylamino)-2-aminonaphthalene-4:8-disulphonic acid,
3-N-(2':4'-dichloro-s-triazin-6'-ylamino)-6-sulphoaniline,
3-N-(2':5':6'-trichloropyrimidin-4'-ylamino)-6-sulphoaniline,
3-N-(2':4':5'-trichloropyrimidin-6'-ylamino)-6-sulphoaniline,
3-N-(2':4'-dichloro-5'-cyanopyrimidin-6'-ylamino)-6-sulphoaniline,
3-N-(2':6'-dichloro-5'-cyanopyrimidin-4'-ylamino)-6-sulphoaniline,
4-N-(2':5':6'-trichloropyrimidin-4'-ylamino)-2-sulphoaniline,
4-N-(2':4':5'-trichloropyrimidin-6'-ylamino)-2-sulphoaniline,
3-N-(2':3'-dichloroquinoxaline-5'-(and 6')carbonyl-amino)-6-sulphoaniline,
3-N-(2':4'-dichloroquinazoline-6'(and 7')sulphonyl-amino)-6-sulphoaniline,
4-N-(2':3'-dichloroquinoxaline-5'-(and 6')sulphonyl-amino)-2-sulphoaniline,
4-N-(2':4'-dichloroquinazoline-6'(and 7')carbonyl-amino)-2-sulphoaniline and
3-N-(1':4'-dichlorophthalazine-6'-carbonylamino)-6-sulphoaniline.

The new dyestuffs in which at least one of Z and Z' stands for a 2-chloro-4-amino-s-triazin-6-yl,
a 2-chloro-4-amino-5-cyano-pyrimidin-6-yl,
a 2-chloro-5-cyano-6-aminopyrimidin-4-yl,
a 2:5-dichloro-4-aminopyrimidin-6-yl or
2:5-dichloro-6-aminopyrimidin-4-yl radical can be obtained by reacting ammonia or an amine having at least one acylatable hydrogen atom with a compound of the formula:

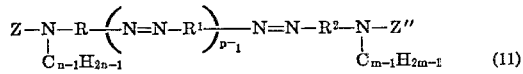

(11)

wherein R, $R^1$, $R^2$, m, n and p have the meanings stated above, Z" represents a 2,4-dichloro-s-triazin-6-yl, a 2,4 (or 6), 5-trichloropyrimidin-6-(or 4-)yl, or a 2,4- (or 6-) dichloro-5-cyano-pyrimidin-6-(or 4-)yl radical, and Z represents a group which may be the same as Z", or a reactive acyl group which remains unchanged in the reaction between the compound of Formula 11 above and ammonia or the acylatable amine.

The new azo dyestuffs are valuable for colouring cellulose textile materials, for example, textile materials comprising natural or regenerated cotton. For colouring such textile materials, the new azo dyestuffs are preferably applied, either by a dyeing or printing process, to the cellulose textile materials in conjunction with a treatment with an acid-binding agent, for example sodium hydroxide, sodium carbonate or sodium bicarbonate, which may be applied to the cellulose textile material before, during or after the application of the dyestuffs. Alternatively when the colouration process involves the use of a heating step a substance can be used, for example, sodium trichloroacetate, which is changed into an acid-binding agent during the heating step. When so applied to cellulose textile materials the new azo dyestuffs react with the cellulose and can be built up to give strong shades having very good fastness to light and to wet treatments especially to severe washing.

A preferred class of dyestuffs are those of formula 1 in which m is 2, n and p represent 1, R represents a 4,8-disulpho-2,6-naphthylene radical and $R^2$ represents a phenylene radical and Z and Z' both represent a 2,4-dichloro-s-triazine, 2-chloro-4-methoxy-s-triazine or a 2-chloro-4-anilino-s-triazine radical in which the anilino radical contains at least one sulphonic acid group and may contain other substituents such as methyl, methoxy, chlorine or carboxy.

A second preferred class of dyestuffs are those of formula 1 in which m, n and p each represents 1, R represents 2-sulpho-1,4-phenylene, $R^2$ represents 1,4-phenylene and Z and $Z^1$ both represent a 2-chloro-4-anilino-s-triazine radical in which the anilino radical carries one or two sulphonic acid groups, and may contain a methyl group.

The classes of dyestuffs are primarily of interest for dyeing and are distinguished by their high fixation efficiency, i.e. by the unusually high proportion of dyestuff absorbed on the fibre from the dyebath which enters into reaction with the cellulose molecule.

The invention is illustrated but not limited by the following examples in which parts and percentages are by weight:

EXAMPLE 1

A solution of 24 parts of the disodium salt of the diaminoazo compound, obtained by coupling diazotised 2-amino-6-acetylaminonaphthalene - 4:8 - disulphonic acid with 3-ω-sulphomethylaminotoluene in acid medium and hydrolysing the compound so obtained, in 200 parts of water is added at 10° C. to a solution of 20 parts of the monosodium salt of 2:4-dichloro - 6-(3'-sulphophenylamino)-s-triazine in 220 parts of water and 40 parts of acetone and the mixture is heated at 45°–50° C. for 3½ hours, the pH being maintained at 7 by the addition of a 10% aqueous solution of sodium carbonate. The mixture is treated with 15 parts of sodium chloride, filtered, and the residue on the filter is then dried.

The dyestuff so obtained contains 1.98 atoms of hydrolysable chlorine per azo group present. When applied to cellulose textile materials in conjunction with a treatment with an acid-binding agent the dye possesses a very high degree of fixation and yields reddish-yellow shades having good fastness to washing and to light.

The following table gives the shades of further examples of the new dyestuffs of the invention which are obtained by the general method of Example 1 by condensing the sodium salt of the diamino azo compound listed in column 2 with two molar proportions of the heterocyclic compound or other acylating agent listed in column 3 of the table. In some cases isolation of the dyestuff is preferably carried out in the presence of a stabiliser such as a mixture of alkali metal acid phosphates having a pH of about 6.0 to 7.0.

| Example | Diaminomonoazo compound | Heterocyclic compound | Shade |
|---|---|---|---|
| 1.2 | 2-amino-6-(4'-amino-3'-methoxy-6'-methylphenylazo)naphthalene-4,8-disulphonic acid. | 2,4-dichloro-6-(2'carboxy-4'-sulphophenylamino)-s-triazine. | Reddish yellow. |
| 1.3 | do | 2,4-dichloro-6-(2'-methyl-5'-sulphophenylamino)-s-triazine. | Do. |
| 1.4 | do | 2,4-dichloro-6-amino-s-triazine. | Do. |
| 1.5 | do | Cyanuric bromide. | Do. |
| 1.6 | do | 2,4-dichloro-6-methoxy-s-triazine. | Do. |
| 1.7 | 2-amino-6-(4'-methylaminophenylazo)naphthalene-4,8-disulphonic acid. | do | Do. |
| 1.8 | do | 2,4,5,6-tetrachloropyrimidine. | Do. |
| 1.9 | do | 5-cyano-2,4,6-trichloropyrimidine. | Do. |
| 1.10 | do | 5-cyano-2,4,6-tribromopyrimidine. | Do. |
| 1.11 | do | Cyanuric chloride. | Do. |
| 1.12 | do | 2,4-dichloro-6-(4'-sulphophenylamino)-s-triazine. | Do. |
| 1.13 | do | β-Chloropropionyl chloride. | Do. |
| 1.14 | do | Chloroacetyl chloride. | Do. |
| 1.15 | do | 2,4-dichloroquinazoline-6-carbonyl chloride. | Do. |
| 1.16 | do | 2,4-dichloroquinazoline-7-carbonyl chloride. | Do. |
| 1.17 | do | 2,3-dichloroquinoxaline-5-carbonyl chloride. | Do. |
| 1.18 | do | 2,4-dichloropyrimidine-5-carbonyl chloride. | Do. |
| 1.19 | do | 2,4-dichloro-6-(3'-sulphophenylamino)-s-triazine. | Do. |
| 1.20 | do | 2,4-dibromo-6-(3'-sulphophenylamino)-s-triazine. | Do. |
| 1.21 | do | 2,4-dichloro-6-(N-3'-sulphophenyl-N-methylamino)-s-triazine. | Do. |
| 1.22 | do | 2,4-dichloro-6-(3',5'-disulphophenylamino)s-triazine. | Do. |
| 1.23 | do | 2,4-dichloro-6-(2'-carboxy-4'-sulphophenylamino)s-triazine. | Do. |
| 1.24 | do | 2,4-dichloro-6-(2'-methyl-5'-sulphophenylamino)-s-triazine. | Do. |
| 1.25 | 6-amino-2-(4'-amino-2'-methylphenylazo)naphthalene-4,8-disulphonic acid. | do | Do. |
| 1.26 | do | Cyanuric chloride. | Do. |
| 1.27 | do | 2-methoxy-4,6-dichloro-s-triazine. | Do. |
| 1.28 | do | 2,4,5,6-tetrachloropyrimidine. | Do. |
| 1.29 | do | 2,4-dichloro-6-thiocyano-s-triazine. | Do. |
| 1.30 | do | 2,3-dichloroquinoxaline-6-carbonyl chloride. | Do. |
| 1.31 | do | Acrylyl chloride. | Do. |
| 1.32 | do | 2,4-dichloro-6-(3'-sulphophenylamino)-s-triazine. | Do. |
| 1.33 | 4,4'-diamino-1,1'-azobenzene-2-sulphonic acid. | do | Do. |
| 1.34 | do | 2,4-dichloro-6-(4'-sulphophenylamino)-s-triazine. | Do. |
| 1.35 | do | 2,4-dichloro-6-(2'-methyl-5'-sulphophenylamino)-s-triazine. | Do. |

| Example | Diaminomonoazo compound | Heterocyclic compound | Shade |
| --- | --- | --- | --- |
| 1.36 | 4,4'diamino-1,1'-azobenzene-2-sulphonic acid | 2,4-dichloro-6-(2'-carboxy-4'-sulphophenylamino)-s-triazine | Reddish-yellow. |
| 1.37 | do | 2,4-dichloro-6-(N-3'-sulphophenyl-N-methylamino)-s-triazine | Do. |
| 1.38 | 6-amino-2-(4'-amino-3'-methylphenylazo)-naphthalene-4,8-disulphonic acid | do | Do. |
| 1.39 | do | 5-cyano-2,4,6-trichloropyrimidine | Do. |
| 1.40 | do | 2,4-dichloro-6-(3'-sulphophenylamino)-s-triazine | Do. |
| 1.41 | do | 2,4-dichloroquinazoline-6-carbonylchloride | Do. |
| 1.42 | 1:1-mixture of 4-amino-1-(4'-amino-2'-sulphophenylazo)-naphthalene-6- and -7-sulphonic acids | 2-methoxy-4,6-dichloro-s-triazine | Do. |
| 1.43 | 6-amino-2-(4'-amino-3'-carboxyphenylazo)naphthalene-4,8-disulphonic acid | do | Do. |
| 1.44 | do | Cyanuric chloride | Do. |
| 1.45 | do | 2,4-dichloro-6-amino-s-triazine | Do. |
| 1.46 | do | 5-cyano-2,4,6-trichloropyrimidine | Do. |
| 1.47 | do | 2,4,5,6-tetrachloropyrimidine | Do. |
| 1.48 | do | 2,4-dichloro-6-(3'-sulphophenylamino)-s-triazine | Do. |
| 1.49 | 6-amino-2-(4'-amino-2',5'-dimethoxyphenylazo)-naphthalene-4,8-disulphonic acid | 2-methoxy-4,6-dichloro-s-triazine | Do. |
| 1.50 | 4-methylamino-4'-amino-3'-methoxy-6'-methylazobenzene | 2,4-dichloro-6-(3'-sulphophenylamino)-s-triazine | Do. |
| 1.51 | do | 2,4-dichloro-6-(4'-sulphophenylamino)-s-triazine | Do. |
| 1.52 | do | 2,4-dichloro-6-(2'-methyl-5'-sulphophenylamino)-s-triazine | Do. |
| 1.53 | do | 2,4-dichloro-6-(3'-β-sulphatoethylsulphonylphenylamino)-s-triazine | Do. |
| 1.54 | 6-amino-2(4'-amino-3'-methoxy-6'-methylphenylazo)naphthalene-4:8-disulphonic acid | 2,4-dichloro-6-(2'-methyl-5'-sulphophenylamino)-s-triazine | Do. |
| 1.55 | 3:4'-diamino-3'-methoxy-6'-methyl-6-sulpho-1:1'-azobenzene | 2,4-dichloro-6-(3'-sulphophenylamino)-s-triazine | Do. |
| 1.56 | do | 2,4-dichloro-6-(3':5'-disulphophenylamino)-s-triazine | Do. |
| 1.57 | 6-amino-2-(4'-amino-2':5'-dimethylphenylazo)naphthalene-4:8-disulphonic acid | 2,4-dichloro-6-(3'-sulphophenylamino)-s-triazine | Do. |
| 1.58 | 6-amino-2-(4'-amino-5'-sulphonaphth-1'-ylazo)naphthalene-4:8-disulphonic acid | do | Dull red. |
| 1.59 | do | 2,4-dichloro-6-methoxy-s-triazine | Do. |
| 1.60 | do | 2,4-dichloro-6-amino-s-triazine | Do. |
| 1.61 | 3:4'-diamino-3'-methoxy-6'-methyl-6-sulpho-1:1'-azobenzene | 2,4-dichloro-6-(2':5'-disulphoanilino)-s-triazine | Reddish-yellow. |
| 1.62 | 6-amino-2-(4'-aminophenylazo)naphthalene-4:8-disulphonic acid | do | Do. |
| 1.63 | 6-amino-2[4'(4''-N-methylaminophenylazo)-2':5'-dimethylphenylazo]naphthalene-4:8-disulphonic acid | 2,4-dichloro-6-(3'-sulphophenylamino)-s-triazine | Do. |
| 1.64 | 6-amino-2[4'(4''-methylaminophenylazo)-3'-methoxy-6'-methylphenylazo]naphthalene-4:8-disulphonic acid | 2,4-dichloro-6-(3':5'-disulphophenylamino)-s-triazine | Do. |
| 1.65 | 4-amino-4'-N-methylamino-3-methoxy-6-methyl-1:1'-azobenzene | do | Do. |
| 1.66 | do | 2,4-dichloro-6-(2'-carboxy-4'-sulphophenylamino)-s-triazine | Do. |
| 1.67 | 6-amino-2[4'-(4''-N-methylaminophenylazo)-6'-sulphonaphth-1'-ylazo]naphthalene-4:8-disulphonic acid | 2,4-dichloro-6-(3'-sulphophenylamino)-s-triazine | Do. |

EXAMPLE 2

A solution of 12 parts of the disodium salt of 6-amino - 2(4' - N-methylaminophenylazo)naphthalene-4:8-disulphonic acid in 150 parts of water is added with stirring to a suspension of 9.6 parts of cyanuric chloride in 80 parts of acetone, 100 parts of water and 100 parts of ice. The mixture is stirred for ½ hour at 0°–5° C. then the pH is adjusted to 7 by the addition of an aqueous solution of sodium carbonate and stirring is continued for a further 2 hours. A solution of 12 parts of the sodium salt of 2-methyl-4-sulphoaniline in 120 parts of water is added and the mixture is heated at 45°–50° C. for 3 hours, the pH being maintained at 7 by the addition of a 10% aqueous solution of sodium carbonate. 20 parts of sodium chloride are added, the mixture is filtered and the residue on the filter is then dried.

The dyestuff composition so obtained is found to contain 1.8 atoms of hydrolysable chlorine per molecule. When applied to cellulose textile materials in conjunction with a treatment with an acid-binding agent, the dye possesses a high degree of fixation and gives strong reddish-yellow shades having good fastness to washing and to light.

The following table gives the shades of further examples of the new dyestuffs of the invention which are obtained by the general methods described in Example 2 by condensing the diaminoazo compound named in the second column with the heterocyclic compound named in the third column and reacting the halogeno compound so obtained with the amine named in the fourth column of the table.

| Example | Diaminoazo compound | Heterocyclic compound | Amine | Shade |
| --- | --- | --- | --- | --- |
| 2.2 | 6-amino-2-(4'-methylaminophenylazo)naphthalene-4,8-disulphonic acid | Cyanuric chloride | Ammonia | Reddish-yellow. |
| 2.3 | do | do | 3-aminophenyl-β-sulphatoethyl sulphone | Do. |
| 2.4 | do | do | β-Hydroxyethylamine | Do. |
| 2.5 | do | 5-cyano-2,4,6-trichloropyrimidine | Ammonia | Do. |
| 2.6 | 6-amino-2-(4'-amino-2'-methylphenylazo)naphthalene-4,8-disulphonic acid | do | 3-sulphoaniline | Do. |
| 2.7 | do | Cyanuric chloride | β-Hydroxyethylamine | Do. |
| 2.8 | do | do | Ammonia | Do. |
| 2.9 | 6-amino-2-(4'-amino-3'-methoxy-6'-methylphenylazo)naphthalene-4,8-disulphonic acid | do | β-Hydroxyethylamine | Do. |
| 2.10 | 6-amino-2-(4'-amino-2',5'-dimethylphenylazo)naphthalene-4,8-disulphonic acid | do | Methylamine | Do. |

EXAMPLE 3

Diazotised 6 - amino - 2(5' - cyano-2':6'-dichloropyrimidin-4'-ylamino)naphthalene-4:8 - disulphonic acid is coupled with an equimolecular proportion of m-aminoacetanilide in acid medium. A solution of 6.9 parts of the disodium salt of the aminomonoazo compound so obtained in 100 parts of water is added with stirring to a suspension of 2.3 parts of 2 - methoxy-4:6-dichloro-s-triazine in 20 parts of acetone and 40 parts of water. The mixture is heated at 40° C. for 2 hours the pH being maintained at 7 by the addition of a 10% aqueous solution of sodium carbonate. 10 parts of sodium chloride are added, the mixture is filtered and the residue on the filter is then dried.

The dyestuff composition so obtained contains 3.6 atoms of hydrolysable chlorine per molecule. When applied to cellulose textile materials in conjunction with a treatment with an acid-binding agent the dye yields reddish-yellow shades possessing good fastness to light and to washing.

The following table gives the shades of further examples of the new dyestuffs of the invention obtained by the general method of Example 3 by coupling the diazonium salt of the amino compound named in the second column of the table with the coupling component named in the third column and condensing the aminoazo compound so obtained with an equimolecular proportion of the acylating agent named in the fourth column of the table.

consisting of methyl, methoxy, carboxylic acid, methanoylamido and ureido, $m$, $n$ and $p$ each independently have a value of 1–2, and Z and Z' are the same or different cellulose-reactive substitutents selected from the group consisting of 2-chloro-4-sulphoanilino-s-triazin-6-yl,
2-chloro-4-(carboxysulphoanilino)-s-triazin-6-yl,
2-chloro-4-(sulpho-toluidino)-s-triazin-6-yl,
2-chloro-4-amino-s-triazin-6-yl,
2-chloro-4-methoxy-s-triazin-6-yl,
2-chloro-4-(sulpho-N-methylanilino)-s-triazin-6-yl,
2-chloro-4-(disulphoanilino)-s-triazin-6-yl,
2-chloro-4-(sulphatoethyanilino)-s-triazin-6-yl,
2-chloro-4-(lower alkylamino)-s-triazin-6-yl wherein the alkyl contains up to 4 carbon atoms,
2-chloro-4-(hydroxy-loweralkylamino)-s-triazin-6-yl wherein the alkyl contains up to 4-carbon atoms,
2,4-dichloro-s-triazin-6-yl,
2-bromo-4-sulphoanilino-s-triazin-6-yl,
2,4-di-bromo-s-triazin-6-yl,
trichloropyrimidine, 5-cyano-dichloropyrimidine,
5-cyano-dibromopyrimidine,
β-chloro-propionyl, chloroacetyl, 2,4-dichloro-quinazoline-6- and 7-carbonyl, 2,3-dichloroquinoxaline-5- and 6-carbonyl, 2,4-dichloropyrimidine-5-carbonyl and acryloyl.

| Example | Amino compound | Coupling component | Acylating agent | Shade |
|---|---|---|---|---|
| 3.2 | 6-amino-2(5'-cyano-2':6'-dichloropyrimidin-4'-ylamino)naphthalene-4:8-disulphonic acid. | N-methylaniline | Cyanuric chloride | Reddish-yellow. |
| 3.3 | do | do | 2,4-dichloro-6-(3'-sulphpohenylamino)-s-triazine | Do. |
| 3.4 | do | m-Ureidoaniline | 2,3-dichloroquinoxaline-6-carboxylic acid chloride | Do. |
| 3.5 | do | do | 2,4-dichloro-6-(3',5'-disulphoaniline)-s-triazine | Do. |
| 3.6 | 6-amino-2(β-chloropropionylamino)naphthalene-4:8-disulphonic acid. | N-methylaniline | Cyanuric chloride | Do. |
| 3.7 | do | do | 2,4-dichloro-6-(2'-methyl-5'-sulphophenyl-amino)-s-triazine | Do. |

EXAMPLE 4

3.6 parts of the trisodium salt of bis-monochlorotriazinylaminoazo compound prepared as in Example 1.55 are dissolved in 110 parts of a 10% aqueous solution of pyridine and the mixture is heated at 80°–85° C. for 1½ hours. The solution is cooled to 25° C. and poured into 400 cc. of acetone. The mixture is filtered and the residue is then dried.

The dyestuff so obtained, when applied to cellulose textile materials in conjunction with a treatment with an acid-binding agent yields reddish-yellow shades having good fastness to washing and to light.

As will be apparent from the above, dyestuffs according to the invention may be characterized by the formula:

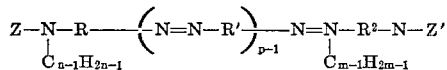

wherein R is selected from the group consisting of phenylene, monosulphophenylene and disulphonaphthalene, R' is selected from the group consisting of dimethyl-1,4-phenylene, monomethyl monomethoxy-1,4-phenylene and monosulpho-1,4-naphthalene,
R² is selected from the group consisting of monosulpho-1,4-naphthalene and 1,4-phenylene which can be substituted by up to two radicals selected from the group With this group of dyestuffs, a prepared subgroup is represented by the formula:

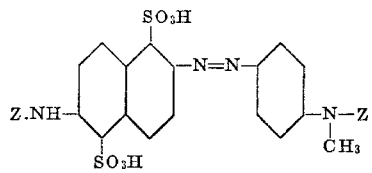

wherein Z represents a radical selected from the group consisting of 2,4-dichloro-s-triazin-6-yl,
2-chloro-4-methoxy-s-triazin-6-yl,
2-chloro-4-sulphoanilino-s-triazin-6-yl,
2-chloro-4-sulphocarboxyanilino-s-triazin-6-yl,
2-chloro-4-sulphotoluidino-s-triazin-6-yl and
2-chloro-4-disulphoanilino-s-triazin-6-yl.

Another subgroup of preference is shown by the formula:

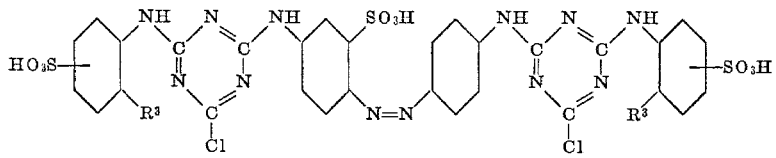

wherein each R³ represents a member selected from the group consisting of H, CO₂H, or CH₃.

We claim:
1. Azo dyestuff of the formula

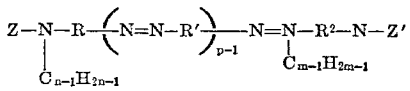

wherein R selected from the group consisting of phenylene, monosulphophenylene and disulphonaphthalene, R' is selected from the group consisting of dimethyl-1,4-phenylene, monomethyl monomethoxy-1,4-phenylene and monosulpho-1,4-naphthalene, $R^2$ is selected from the group consisting of monosulpho-1,4-naphthalene and 1,4-phenylene which can be substituted by up to two radicals selected from the group consisting of methyl, methoxy, carboxylic acid, methanoylamido and ureido, m, n and p each independently have a value of 1–2, and Z and Z' are the same or different cellulose reactive substituents selected from the group consisting of 2-chloro-4-sulphoanilino-s-triazin-6-yl,
2-chloro-4-(carboxysulphoanilino)-s-triazin-6-yl,
2-chloro-4-(sulpho-toluidino)-s-triazin-6-yl,
2-chloro-4-amino-s-triazin-6-yl,
2-chloro-4-methoxy-s-triazin-6-yl,
2-chloro-4-(sulpho-N-[lower alkyl]methylanilino)-s-triazin-6-yl,
2-chloro-4-(disulphoanilino)-s-triazin-6-yl,
2-chloro-4-(sulphatoethylanilino)-s-triazin-6-yl,
2-chloro-4-(lower alkylamino)-s-triazin-6-yl wherein the alkyl contains up to 4 carbon atoms,
2-chloro-4-(hydroxy-loweralkylamino)-s-triazin-6-yl wherein the alkyl contains up to 4 carbon atoms,

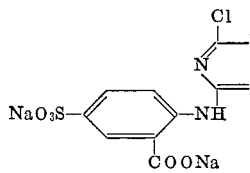

2,4-dichloro-s-triazin-6-yl,
2-bromo-4-sulphoanilino-s-triazin-6-yl,

2,4-di-bromo-s-triazin-6-yl, trichloropyrimidine, 5-cyano-dichloropyrimidine, 5-cyano-dibromopyrimidine,
β-chloropropionyl, chloroacetyl 2,4-dichloro-quinazoline-6- and 7-carbonyl,
2,3-dichloroquinoxaline-5- and 6-carbonyl,
2,4-dichloropyrimidine-5-carbonyl and acryloyl.

2. An azo dyestuff as claimed in claim 1 having the formula

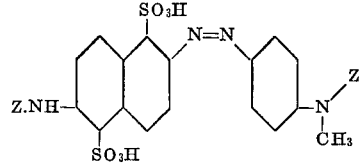

wherein Z represents a radical selected from the group consisting of 2,4-dichloro-s-triazin-6-yl,
2-chloro-4-methoxy-s-triazin-6-yl,
2-chloro-4-sulphoanilino-s-triazin-6-yl,
2-chloro-4-sulphocarboxyanilino-s-triazin-6-yl,
2-chloro-4-sulphotoluidino-s-triazin-6-yl and
2-chloro-4-disulphoanilino-s-triazin-6-yl.

3. An azo dyestuff as claimed in claim 1 having the formula

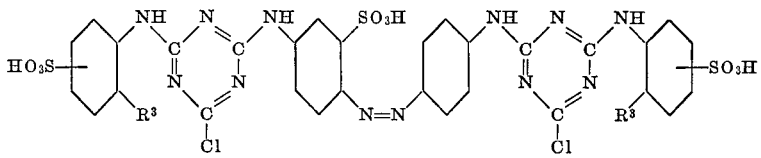

wherein each $R^3$ represents a member selected from the group consisting of H, $CO_2H$, or $CH_3$.

4. An azo dyestuff as claimed in claim 1 having the formula—

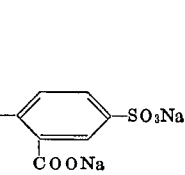

5. An azo dyestuff as claimed in claim 1 having the formula—

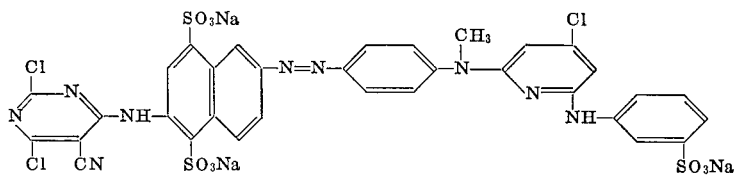

6. An azo dyestuff as claimed in claim 1 having the formula—

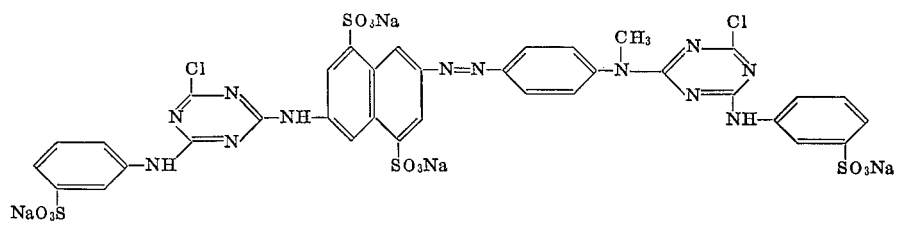

7. An azo dyestuff as claimed in claim 1 having the formula—

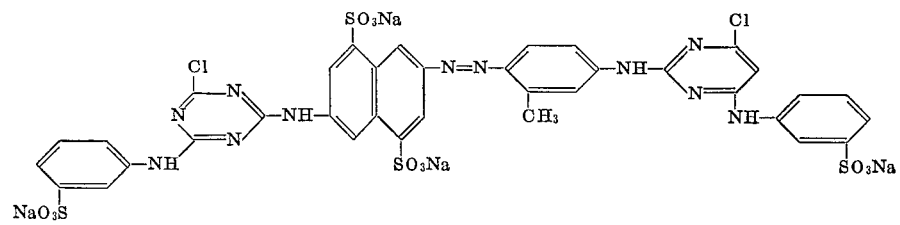

References Cited

UNITED STATES PATENTS

| | | | |
|---|---|---|---|
| 3,349,074 | 10/1967 | Andrew | 260—154X |
| 3,446,790 | 5/1969 | Andrew | 260—154X |
| 3,108,846 | 10/1963 | Utsunomiya et al. | 260—153X |
| 3,169,952 | 2/1965 | Riat et al. | 260—153X |

FOREIGN PATENTS

| | | | |
|---|---|---|---|
| 97,954 | 5/1964 | Denmark | 260—154 |

FLOYD D. HIGEL, Primary Examiner

U.S. Cl. X.R.

8—26, 41, 50, 71; 260—154, 187, 194, 196, 207.1, 249.8, 250, 256.4, 507, 518, 562